(12) United States Patent
Voelker et al.

(10) Patent No.: US 10,102,979 B2
(45) Date of Patent: Oct. 16, 2018

(54) ACTINIC AND ELECTRON BEAM RADIATION CURABLE WATER BASED ELECTRODE BINDERS AND ELECTRODES INCORPORATING SAME

(71) Applicant: Miltec Corporation, Stevensville, MD (US)

(72) Inventors: Gary Voelker, Bumpass, VA (US);
John Arnold, Pittstown, NJ (US);
Joseph Fasolo, Edgewood, MD (US)

(73) Assignee: Miltec Corporation, Stevensville, MD (US)

( * ) Notice: Subject to any disclaimer, the term of this patent is extended or adjusted under 35 U.S.C. 154(b) by 264 days.

(21) Appl. No.: 14/279,963

(22) Filed: May 16, 2014

(65) Prior Publication Data

US 2014/0342223 A1 Nov. 20, 2014

Related U.S. Application Data

(60) Provisional application No. 61/824,613, filed on May 17, 2013.

(51) Int. Cl.
*H01G 11/48* (2013.01)
*H01G 11/86* (2013.01)
(Continued)

(52) U.S. Cl.
CPC ............. *H01G 11/48* (2013.01); *H01G 11/28* (2013.01); *H01G 11/86* (2013.01); *H01M 4/04* (2013.01);
(Continued)

(58) Field of Classification Search
CPC .......................................... H01M 4/621–4/623
See application file for complete search history.

(56) References Cited

U.S. PATENT DOCUMENTS

| 4,218,349 | A | 8/1980 | Minatono |
| 4,600,745 | A | 7/1986 | Creighton |

(Continued)

FOREIGN PATENT DOCUMENTS

| EP | 0662728 | 4/1998 |
| JP | H08-124560 | 5/1996 |

(Continued)

OTHER PUBLICATIONS

International Search Report and Written Opinion; (total of 8 pages); dated Sep. 11, 2014; from International Patent Application No. PCT/US2014/038328.

(Continued)

*Primary Examiner* — Barbara L Gilliam
*Assistant Examiner* — Robert S Carrico
(74) *Attorney, Agent, or Firm* — Dority & Manning, P.A.

(57) ABSTRACT

A process for manufacturing an electrode utilizing electron beam (EB) or actinic radiation to cure the electrode binder is provided. A process is also disclosed for mixing specific actinic or EB radiation curable polymer precursors with electrode solid particles to form an aqueous mixture, application of the mixture to an electrode current collector, followed by the application of actinic or EB radiation to the current collector for curing the polymer, thereby binding the electrode binder to the current collector. Lithium ion batteries, electric double layer capacitors, and components produced therefrom are also provided.

22 Claims, 3 Drawing Sheets

(51) Int. Cl.
*H01G 11/28* (2013.01)
*H01M 4/139* (2010.01)
*H01M 4/04* (2006.01)
*H01M 4/62* (2006.01)

(52) U.S. Cl.
CPC ......... *H01M 4/0404* (2013.01); *H01M 4/139* (2013.01); *H01M 4/622* (2013.01); *Y02E 60/13* (2013.01); *Y02T 10/7022* (2013.01)

(56) References Cited

U.S. PATENT DOCUMENTS

| | | | |
|---|---|---|---|
| 4,810,600 A | 3/1989 | Périard et al. | |
| 5,124,076 A | 6/1992 | Smuckler | |
| 5,238,758 A | 8/1993 | Lee et al. | |
| 5,384,213 A | 1/1995 | Olsen | |
| 5,409,786 A * | 4/1995 | Bailey | H01M 4/13 252/519.33 |
| 5,429,891 A | 7/1995 | Gozdz et al. | |
| 5,512,214 A | 4/1996 | Koksbang | |
| 5,521,248 A | 5/1996 | Drake et al. | |
| 5,565,284 A | 10/1996 | Koga et al. | |
| 6,174,623 B1 | 1/2001 | Shackle | |
| 6,211,302 B1 | 4/2001 | Ho et al. | |
| 6,284,842 B1 | 9/2001 | Ho et al. | |
| 6,602,766 B2 | 8/2003 | Chang et al. | |
| 6,680,147 B2 | 1/2004 | Lee | |
| 6,743,876 B2 | 6/2004 | Wille et al. | |
| 6,855,378 B1 | 2/2005 | Narang | |
| 7,189,477 B2 | 3/2007 | Mikhaylik | |
| 7,338,734 B2 | 3/2008 | Chiang et al. | |
| 7,387,851 B2 | 6/2008 | Gozdz et al. | |
| 7,579,112 B2 | 8/2009 | Chiang et al. | |
| 7,754,382 B2 | 7/2010 | Kurihara et al. | |
| 7,951,430 B2 | 5/2011 | Sugiyama et al. | |
| 8,431,673 B2 | 4/2013 | Wang et al. | |
| 2002/0127471 A1 | 9/2002 | Siret et al. | |
| 2004/0131934 A1* | 7/2004 | Sugnaux | B82Y 20/00 429/209 |
| 2005/0026025 A1 | 2/2005 | Shah et al. | |
| 2005/0258566 A1 | 11/2005 | Naarmann et al. | |
| 2008/0032192 A1 | 2/2008 | Yokomizo et al. | |
| 2009/0017323 A1 | 1/2009 | Webb et al. | |
| 2010/0047690 A1* | 2/2010 | Tsuchiya | H01M 4/621 429/217 |
| 2011/0081575 A1* | 4/2011 | Voelker | H01M 4/13 429/217 |

FOREIGN PATENT DOCUMENTS

| | | |
|---|---|---|
| JP | H08-273671 | 10/1996 |
| WO | WO 95/29509 | 2/1995 |
| WO | WO 99/63609 | 12/1999 |
| WO | WO 2006/096436 | 9/2006 |
| WO | WO 2014185381 A1 | 11/2014 |

OTHER PUBLICATIONS

Nordstrom et al., "Acrylic Copolymers for Radiation-Cured Coatings", Ind, Eng. Chem. Prod. Res. Dev., 1970, 9(2) 155-158.

Molenaar et al. "Adhesion of electron beam curable coatings on metal substrates", Prog. Organic Coatings, 1993, 22:393-399.

PCT International Preliminary Report on Patentability including the PCT Written Opinion of the International Searching Authority for PCT International Application No. PCT/US2014/038328; 5 sheets; dated Nov. 17, 2015.

Extended European Search Report for European Patent Application No. 14797223.6-1373 (PCT/US2014/038328) dated Dec. 13, 2016; 8 pages.

* cited by examiner

ACTINIC AND ELECTRON BEAM RADIATION CURABLE WATER BASED ELECTRODE BINDERS AND ELECTRODES INCORPORATING SAME

CROSS REFERENCE TO RELATED APPLICATIONS

The present application claims filing benefit of U.S. Provisional Patent Application Ser. No. 61/824,613 having a filing date of May 17, 2013, which is incorporated herein by reference.

STATEMENT REGARDING FEDERALLY SPONSORED RESEARCH OR DEVELOPMENT

This invention was made with government support under Contract No. DE-EE0005421 awarded by the Department of Energy. The government has certain rights in this invention.

FIELD OF THE DISCLOSURE

The present invention is in the technical field of electrodes as may be utilized in alkali-ion secondary (rechargeable) batteries, and particularly in the technical field of lithium ion secondary batteries, and in electric double layer capacitors and manufacture thereof.

BACKGROUND

Electrochemical devices including batteries and electric double layer capacitors (EDLCs) have found great usefulness in power supplies, including power supplies of portable devices and auxiliary power supplies for automobiles. For example, lithium ion batteries are one of the most popular battery types for use in portable electronics such as phones, music players, portable computers, and so forth. Lithium ion batteries have very high energy-to-weight ratios, no memory effect, and a slow loss of charge when not in use. Lithium ion batteries are also growing in popularity for military, electric vehicle, and aerospace applications due to their high energy density.

The basic working unit of a lithium ion battery is an electrochemical cell. The electrochemical cell includes two electrodes, an anode and cathode that are physically separated from one another by a separator and are ionically connected to each other by an electrolyte. The anode typically includes a thin metal sheet of electrically conducting material, such as copper, which is referred to as the anode current collector and is coated with solid anode material particles. The anode particles are held to the anode current collector and to each other by an anode binder, which is typically a polymer that retains adhesion and physical characteristics such that it does not swell or disintegrate during use. Typical anode particles include graphite, or silicon-based materials or titanium materials or combinations of the three materials and optionally with some carbon black. The sizes of the solid anode particles coated on the anode current collector typically range from several nanometers to tens of microns in nominal diameter.

The lithium ion battery electrolyte may be liquid, solid or a gel. For liquid electrolytes, a separator is employed to maintain the physical separation of the anode from the cathode. A typical separator is a thin porous polymer sheet in which the void spaces are filled with electrolyte. A typical liquid electrolyte is a mixture of organic carbonates such as alkyl carbonate containing complexes of lithium ions, generally non-coordinated anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). Typical solid electrolytes are polymers. For instance, U.S. Pat. No. 7,387,851 to Gozdz, et al, describes an electrolyte formed from a liquid polymer, oligomer, or monomer electrolyte precursor that can be crosslinked to form a solid polymer electrolyte. A wide variety of materials may be used as a gel electrolyte. The electrolytes are designed to withstand the voltage between the anode and the cathode, and offer a high mobility of lithium ions without a risk of flammability.

The cathode typically employed in a lithium ion battery includes a thin metal sheet of electrically conducting material such as aluminum, which is referred to as the cathode current collector, and is coated with solid cathode particles. Cathode particles are held to the cathode current collector and to each other by a cathode binder, which like the anode binder is typically a polymer that retains adhesion and physical characteristics such that it does not swell or disintegrate during use, and the cathode binder and anode binder can be the same or can differ from one another. Typical cathode particles include lithium metal oxides such as lithium cobalt, manganese, nickel, or vanadium oxides, and other lithium compounds such as lithium iron phosphate. The cathode particles often include a small amount of carbon as well, to improve conductivity, though the carbon will generally not be as graphitic as the main carbon of the anode. The sizes of the cathode particles coated on the current collector range from several nanometers to several microns in nominal diameter.

An EDLC, also known as a supercapacitor or an ultracapacitor, is an electrochemical capacitor that has an unusually high energy density when compared to traditional capacitors. An EDLC includes two separate electrodes of the same construction separated by an intervening substance that provides effective separation of charge despite a vanishingly thin (on the order of nanometers) physical separation of the layers. The electrode of an EDLC employs a current collector, typically a current collector similar to that of a lithium ion battery cathode, such as aluminum. To improve energy storage density a nanoporous material, a porous particulate carbon such as graphite or activated charcoal is applied to the surface of the current collector with a binder, which is typically a polymer produced to retain adhesion and hardness and not swell or disintegrate during use. The particle size of the carbon generally ranges from several nanometers to several microns in nominal diameter. The pores of the carbon are filled with the intervening substance, i.e., an electrolyte that is a liquid or a gel. A typical liquid electrolyte is an organic alkyl carbonate that can include selected lithium salts.

A typical process for forming an electrode such as is found in a lithium ion battery or an EDLC includes:
1) The polymeric binding material is formed into a solution with a solvent such that the solution has a suitably low viscosity for application to the current collector after mixing with the solid particles.
2) The low viscosity binding solution is mixed with the electrode solid particles at approximately 20-80 wt. % of the solvent, and particularly approximately 50 wt. % of the solvent to form a paste.
3) The paste is coated in a thin layer (typically 10 to 200 microns) onto the current collector using conventional coating techniques.

4) The coated current collector is passed through a thermal drying oven where solvent is driven off and the binder polymer is set.
5) The electrode is passed through a pair of rotating rollers separated by a narrow gap (e.g., 5 to 200 microns) to compress the current collector coating to a specified thickness.
6) Typically, both sides of the electrode current collector are coated with the solid anode or cathode particles and processed by the aforementioned steps.

There are multiple shortcomings involved in the manufacturing of electrodes that have a direct effect on the cost of manufacturing. These shortcomings include, without limitation:

a) Solvent used to dissolve the polymer binding material must be vaporized requiring substantial thermal energy input.
b) There are substantial energy inefficiencies associated with thermal drying.
c) The vaporized solvent must be recovered and either disposed of or recycled.
d) The oven required for drying the polymer binding material occupies significant manufacturing space at a significant capital cost.
e) The time required to manufacture the electrodes is increased by the time required for the polymer binding material to be dried in the drying oven.

What are needed in the art are improved materials and methods for forming electrodes. For instance, improved electrode binders for use in lithium ion cathodes and anodes and EDLC electrodes would be of great use.

SUMMARY

According to one embodiment, a method of forming an electrode is disclosed. In general, a method can include combining a polymer precursor, water, and solid electrode particles to form an aqueous mixture. The aqueous mixture can also include a crosslinking agent capable of forming covalent bonds with the polymer precursor upon subjection of the mixture to actinic or electron beam radiation. The polymer precursor can be dispersed or dissolved in the water of the aqueous mixture.

The method also includes applying the aqueous mixture to a surface of a current collector to form a layer, and thereafter subjecting the layer to actinic or electron beam radiation, thereby polymerizing and crosslinking the polymer precursor to form an electrode binder that serves to bind the solid electrode particles to each other and the current collector and form the electrode. Electrodes described herein can encompass both cathodes and anodes.

Also disclosed is an electrode that can be formed according to the method. For instance, an electrode can include a current collector and a layer on the current collector that includes solid electrode particles held in an electrode binder, the electrode binder including crosslinked polymer precursors. The electrode binder can also include a reacted actinic radiation or electron beam curable crosslinking agent covalently bonded to the polymer precursors. In one embodiment, the electrode binder can also include a photoinitiator.

Also disclosed are products incorporating the electrodes such as a battery, e.g., a lithium ion battery, or a double layer capacitor. In general, the product can include an electrode including the electrode binder held adjacent to one or more additional components of the device such as a second electrode, a separator, an electrolyte, etc.

DETAILED DESCRIPTION

Reference now will be made in detail to various embodiments of the disclosed subject matter, one or more examples of which are set forth below. Each example is provided by way of explanation, not limitation, of the subject matter. In fact, it will be apparent to those skilled in the art that various modifications and variations may be made in the present disclosure without departing from the scope or spirit of the disclosure. For instance, features illustrated or described as part of one embodiment, may be used on another embodiment to yield a still further embodiment. Thus, it is intended that the present disclosure cover such modifications and variations.

In general, the present disclosure is directed to a process for manufacturing electrodes without the need for the costly oven-drying or solvent handling. Also disclosed are electrodes formed according to the process and products such as lithium ion batteries, EDLCs and others as may incorporate the electrodes. More specifically, disclosed electrodes incorporate water dispersible or dissolvable polymer precursors cured with actinic radiation or electron beam radiation.

The process allows for the formation of the electrodes by use of an aqueous mixture in which the polymer precursors are dispersed or dissolved in water in conjunction with solid electrode particles. Utilization of an aqueous mixture in forming the electrodes can provide multiple benefits to the process. For instance, this can decrease costs associated with the formation of the electrodes both directly, as large amounts of expensive organic solvents need no longer be obtained for the process, and indirectly, as recovery processes for organic solvents can be limited or avoided all together. For instance, the aqueous mixture used to form the electrode binders can include less than about 5 wt. %, or about 1 wt. % to about 2 wt. % organic solvents by weight of the mixture. Moreover, the formation process can be cleaner, with the production of little or no potentially dangerous waste products. Upon cure via electron beam or actinic radiation, the water dispersible/dissolvable polymer precursors demonstrate good adhesion to current collectors (e.g., copper or aluminum) while providing excellent resistance to the harsh operating conditions and electrolytic material present in both batteries and EDLCs.

As utilized herein, the term actinic radiation is intended to refer to electromagnetic radiation that is capable of producing photochemical effects. For instance, the aqueous mixture including the polymer precursors can be cured by actinic radiation in the ultraviolet or visible spectrum, both of which can encompass actinic radiation. Conventional ultraviolet and electron beam curable binder resins have only recently been utilized successfully in electrode manufacturing to cure (i.e. polymerize and crosslink) electron binders (see, U.S. Published U.S. Patent Application No. 2011/0081575 to Voelker, et al., which is incorporated herein by reference). In the past, electron beam and actinic radiation curing was limited to the formation of thick opaque films that would not hold up well in the harsh environment of a battery or EDLC. The aqueous mixtures described herein include polymer precursors rather than large fully formed polymers as have been used to form electron binders in the past. Upon curing, the polymer precursors form electron binders that can adhere well to the current collector and also maintain integrity in the harsh environment of the final product.

The polymer precursors can include monomers and/or oligomers that include functional groups curable by use of actinic or electron beam radiation. Curable functional groups are generally selected from carbon-carbon double bond, thiol and epoxy groups. By way of example, carbon-carbon double bond containing curable functional groups include (meth)acrylate, (meth)acrylamide, (meth)acrylthioester, N-vinylamide, vinylester, vinylthioester, allylether, allyamine, allylsulfide, N-vinylamine, vinylether, vinylsulfide, maleate, fumarate, maleamide, fumaramide, thiomaleate, thiofumarate, maleimide, citraconimide and norbornene groups.

In one embodiment, the polymer precursors can include water dispersible or dissolvable monomers including, without limitation, methyl acrylate, ethyl acrylate, 2-chloroethyl vinyl ether, 2-ethylhexyl acrylate, hydroxyethyl methacrylate, butyl acrylate, butyl methacrylate, or mixtures thereof. The polymer precursors can be solely monomers that can be crosslinked to form the crosslinked network of the electrode binder. Alternatively, monomeric polymer precursors can be utilized in conjunction with oligomeric polymer precursors. The use of monomeric polymer precursors is not a requirement, however, and only oligomeric polymer precursors can be utilized in one embodiment and the oligomeric polymer precursors can be crosslinked by use of a crosslinking agent in conjunction with the application of actinic or electron beam radiation.

The polymer precursors can generally have a number average molecular weight of less than about 150,000. For instance, when considering oligomeric polymer precursors, the oligomers can have a number average molecular weight of from about 7,000 to about 150,000, from about 10,000 to about 130,000, from about 10,000 to about 50,000, or from about 15,000 to about 40,000.

Oligomers that can be utilized as polymer precursors are not particularly limited, provided that they are or can be functionalized so as to be water dispersible or dissolvable and include suitable crosslinking functionality as described. For example, functionalized polyurethanes, polyesters, polyolefins, cellulose derivatives, rubbers, latex, polysulfides, acrylics, silicones, and so forth can be utilized.

In one embodiment, the polymer precursor can be a functionalized polyurethane precursor. Functionalized polyurethane precursors can be purchased or formed, as desired. For instance, suitable functionalized polyurethane precursors are available from Cytec Industries Inc. Functionalized polyurethane precursors can also be formed according to known methodology, for instance as described in U.S. Pat. No. 8,431,673 to Wang, et al.

The functionalized polyurethane precursors can include the reaction product of a soft segment component, an isocyanate, and a crosslinking component that can provide the desired functionality. The functionalized polyurethane can be formed of any suitable di-isocyanate and any suitable soft segment. For example, the di-isocyanate can be aromatic, aliphatic, araliphatic or cycloaliphatic polyisocyanate or derivatives thereof containing urethane, isocyanurate, allophanate, biuret, uretdione and/or imino-oxadiazinedione groups. Examples of suitable polyisocyanates can include, without limitation, diphenylmethane-2,4'-diisocyanate, diphenylmethane-4,4'-diisocyanate, 2,4-toluene-diisocyanate, 2,6-toluene-diisocyanate, 1,6-diisocyanatohexane, dicyclohexylmethane-2,4'-diisocyanate, dicyclohexylmethane-4,4'-diisocyanate, 5-isocyanato-1-isocyanatomethyl-1,3,3-trimethylcyclohexane (isophorone diisocyanate, IPDI), meta-tetramethylxylylene diisocyanate, 1,3-bis-(isocyanatomethyl)benzene, 1,5-naphthylene diisocyanate, their di-, tri- or oligomers and their adducts with polyols.

In one embodiment, the soft segment molecule can be a diol. In addition, the soft segment can include any linking segments along the soft segment backbone as is generally known in the art. For example, in various embodiments, the soft segment can include polycarbonate, dimer acid, polyester, or polyether linking segments. Examples of the soft segment can include, without limitation, 2-phenoxyethanol, 3-(methylthio)-1-propanol, 4-(methylthio)benzyl alcohol and 2-phenylthioethanol.

The crosslinking component can include a first functional group that can react with the soft segment or the isocyanate and can also include a second functional group that is curable by actinic or electron beam radiation. The first functional group can include, for example, an alcohol, a thiol, or an amine. The second functional group can include curable functional groups as described above. Examples of the crosslinking component can include, without limitation, (meth)acrylates and (meth)acrylamides, such as 2-hydroxyethyl acrylate, 2-hydroxyethyl methacrylate, 4-hydroxybutyl acrylate, hydroxypropyl acrylate (2 isomers), hydroxypropyl methacrylate, pentaerythritol triacrylate, di-tri methylolpropane triacrylate, tricyclodecane-dimethanol monoacrylate, N-methylethanolamine acrylate, N-(hydroxymethyl)acrylamide; N-vinylamides such as 5-(hydroxymethyl)-1-vinyl-2-pyrrolidinone, 3-hydroxy-N-vinyl proprionamide (2-cyano-N-vinylacetamide hydrolyzed to carboxylic acid, then reduced to alcohol); allyls such as diallylamine, allyl alcohol, N-allyl-N-methylamine, N-allyl-N-cyclopentylamine, N-allyl-N-phenyl amine, N-allyl-2,2'-iminodiethanol; vinylethers such as 4-hydroxybutyl vinylether, ethylenegylcol monovinylether, 3,4-dihydro-2H-pyran-2-methanol, diethyleneglycol monovinylether; norbornenes such as 5-norbornene-2-methanol, 5-norbornene-2,3-dimethanol monoacrylate; epoxides such as 2-oxiranylmethanol, (2S,3S)-trans-3-phenyloxirane-2-methanol, trimethylolpropane diglycidylether, pentaerythritol triglycidylether, Bisphenol-A monoglycidylether, Bisphenol-F monoglycidylether, Bisphenol-A (3-chloro-2-hydroxypropyl)glycidylether.

A functionalized polyurethane can generally be prepared according to a two-step process. For instance, in the first step, at least part of the polyisocyanate can be reacted with the crosslinking compound, and in a second step the reaction product obtained is further reacted with the soft segment. The reaction can be performed in the presence of a catalyst, such as for example amine and orgametallic complex catalysts such as dibutyl tin dilaurate. The reaction can be performed at a temperature of from about 20° C. to about 120° C., and can be carried out in the presence of a polymerization inhibitor or stabilizer or any combination thereof. Primary anti-oxidants (free-radical inhibitors) such as quinones, in particular hydroquinone, and di-tert butyl p-cresol can be utilized.

The polymer precursor can be a functionalized polyolefin that is water dispersible or water dissolvable. For instance, oligomeric polyethylene, polypropylene, or copolymers thereof can be polymer precursors of the electrode formation process. The polyolefin polymer precursor can bear one or more substituents, e.g., a functional group such as a carbonyl, sulfide, acrylate, etc. to encourage crosslinking during formation of the electrode. As utilized herein, the term "olefin" generally refers to aliphatic, alicyclic or aromatic compounds having one or more double bonds. Representative olefins include ethylene, propylene, 1-butene, 1-hexene, 1-octene, 4-methyl-1-pentene, butadiene, cyclohexene, dicyclopentadiene, styrene, toluene, α-methylstyrene, etc. A variety of polyolefin polymers can be used including, without limitation, polyethylene, polypropylene, ethylene/styrene interpolymers (ESI), and catalytically modified polymers (CMP), e.g., partially or fully hydrogenated polystyrene or styrene/butadiene/styrene block copolymers, polyvinylcyclohexane, etc.

Cellulose derivatives can be utilized in forming the electrodes. For instance, partially or completely alkylated or acrylated cellulose can be utilized. In one embodiment, cellulose acrylate that is a fatty acid ester of cellulose obtained by substituting a hydroxyl group of cellulose with an acetyl group or an acyl group having 3 or more carbon atoms can be utilized as a polymer precursor. For instance, the degree of substitution of the hydroxyl group of cellulose can satisfy the numerical formula:

$$1.0 < A+B < 3.5$$

in which A is the degree of substitution of hydroxyl groups by an acetyl group, and B is the degree of substitution of hydroxyl groups by an acyl group having 3 or more carbon atoms.

The acyl group having 3 or more carbon atoms may be an aliphatic group or an aromatic hydrocarbon group. For instance, the acyl group having 3 or more carbon atoms may be an alkylcarbonyl ester of cellulose, alkenylcarbonyl ester or aromatic carbonyl ester, and aromatic alkylcarbonyl ester, and they may be further substituted. Specific examples include, without limitation, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a t-butanoyl group, a cyclohexanecarbonyl group, an oleoyl group, a benzoyl group, a naphthylcarbonyl group, a cinnamoyl group, and the like. Among these, preferred are a propionyl group, a butanoyl group, a dodecanoyl group, an octadecanoyl group, t-butanoyl group, an oleoyl group, a benzoyl group, a naphthylcarbonyl group, a cinnamoyl group, and the like.

Specific examples of acrylated cellulose encompassed herein include, without limitation, cellulose acetate, cellulose acetate propionate, cellulose acetate butyrate, and mixtures thereof.

Derivatives of cellulose for use as polymer precursors can be formed according to methods as are generally known in the art. A typical synthesis method is a liquid phase acetylation method with the use of a carboxylic anhydride/acetic acid/sulfuric acid catalyst as described in U.S. Pat. No. 7,951,430 to Suglyama, et al., which is incorporated herein by reference. The formation method can include separating high molecular weight constituents from the product and utilizing the low molecular weight constituents as polymer precursors in an electrode formation method.

In one embodiment, the polymer precursors can include rubber or latex oligomers. For example, polyisoprene and/or polybutadiene and/or styrenebutadiene rubbers as described in U.S. Published Patent Application Serial No. 2011/0081575 to Voelker, et al., previously incorporated by reference, can be utilized. However, the rubber/latex polymer precursors are not limited to materials incorporating only isoprene and/or butadiene components. Functionalized rubber polymer precursors as may be utilized can include at least one of isoprene, butadiene, cyclopentadiene, ethylidene norbornene, and vinyl norbornene monomer units, or combinations thereof.

One embodiment of a polymer precursor is a carboxylated methacrylated isoprene backbone having the general formula:

wherein m is between about 10 and about 1000, or between about 100 and about 1000, or between about 200 and about 500; and n is between 1 and about 20, or between 1 and about 10, or between about 2 and about 10, or between about 2 and about 5.

Another embodiment of a polymer precursor can incorporate a carboxylated methacrylated butadiene backbone and can have the general formula:

wherein m is between about 10 and about 1000, or between about 100 and about 1000, or between about 200 and about 500; and n is between 1 and about 20, or between 1 and about 10, or between about 2 and about 10, or between about 2 and about 5.

Yet another rubber polymer precursor can incorporate a butadiene backbone and can have the general formula:

wherein n is between about 5 and about 2000, or between about 10 and about 1500, or between about 100 and about 1000.

Of course, the polymer precursor can include multiple different backbone segments. For instance isoprene-butadiene copolymers can be utilized as polymer precursors.

The polymer precursors can be functionalized to include additional acidic reactive groups that improve water dispersability, metal adhesion and/or improve curability by EB or actinic radiation crosslinking. For instance, polymer precursors can be functionalized with carboxy, amino, and/or hydroxyl functionality that can increase hydrophilic characteristics of the polymer precursors and improve dispersability of the polymer precursors in the aqueous mixture.

In general, the polymer precursor can be included in an aqueous mixture in an amount from about 4 wt. % to about 25 wt. %, from about 5 wt. % to about 20 wt. % or from about 6 wt. % to about 18 wt. % of the aqueous mixture.

In addition to the polymer precursor, the aqueous mixture can include solid electrode particles. The solid electrode particles can include any particulate materials as are generally known in the art such as, without limitation, carbon particulate materials such as graphene, activated carbon, graphite, low sulfur graphite, carbon black, carbon nanotubes; etc.; ceramic materials including silicon-based materials such as silicon oxides; metal oxide salts such as oxides of lithium, cobalt, manganese, nickel, aluminum or vanadium; and so forth. By way of example, particulate materials can include lithium compounds (i.e., lithiated compounds) such as lithium manganese oxide, lithium cobalt oxide, lithium nickel oxide, lithium nickel cobalt aluminum oxide, lithium iron phosphate, lithium nickel manganese cobalt (NMC), as well as mixtures thereof. The preferred materials for any embodiment can vary depending upon the type of electrode (cathode or anode) as well as the product that will incorporate the electrode, as is known.

The aqueous mixture can generally include the solid electrode particles in an amount of from about 50% by weight of the mixture to about 90% of the mixture, or from about 55% by weight of the mixture to about 85% of the mixture.

The aqueous mixture can also include one or more crosslinking agents. Of course, in those embodiments in which the polymer precursors include functionality to provide direct crosslinking among the precursors, the inclusion of a crosslinking agent may not be necessary. For instance, the aqueous mixture can include one or more crosslinking agents in an amount of from about 0.2 wt. % to about 1 wt. % of the composition, or from about 0.3 wt. % to about 0.7 wt. %. Exemplary crosslinking agents can include those that can react with the polymer precursors of the mixture when subjected to EB and/or actinic radiation. Specific radiation suitable for each crosslinker is generally known in the art. For instance, a crosslinker can react upon subjection of the mixture to actinic radiation in the UV spectrum or in the visible spectrum. Examples of crosslinking agents can include, without limitation, monofunctional acrylates, difunctional acrylates, and multifunctional acrylates and other vinyl compounds, Suitable acrylates may be linear, branched, cyclic, or aromatic. Linear acrylates can include alkyl acrylates wherein the alkyl contains from 4 to 20 carbon atoms. Branched acrylates can include branched alkyl acrylates wherein the alkyl contains from 4 to 20 carbon atoms such as 2-ethylhexyl acrylate or isostearyl acrylate. Cyclic acrylates can include dicyclopentanyl acrylate and n-vinyl caprolactam. Aromatic acrylates can include phenoxyethylacrylate. Difunctional and multifunctional acrylates can include 1,6-hexandiodi(meth)acrylate, 1,9-hexandiodi(meth)acrylate, and tricyclodecanedimethanol diacrylate.

In those embodiments in which the polymer precursors are cured in the presence of actinic radiation, the aqueous mixture can also include a photoinitiator. A photoinitiator may be present in the aqueous mixture at concentrations up to about 1 wt. %, for instance from about 0.2 wt. % to about 1 wt. %, or from about 0.3 wt. % to about 0.7 wt. % of the aqueous mixture.

Exemplary photoinitiators can include, without limitation, benzophenone, hydroxyacetophenone, methylbenzophenone, 4-Phenylbenzophenone, 4,4'-Bis(diethyl amino)benzophenone, Michler's Ketone, 4-(2-hydroxyethoxy)phenyl-(2-hydroxy-2-methylpropyl)ketone, and other benzophenone derivatives, benzyldimethyl ketal, 2-benzyl-2-N,N-dimethylamino-1-(4-morpholinophenyl)-1 butanone; 2-mercaptobenzoxazole, camphorquinone, 2-hydroxy-2-methyl-1-(4-t-butyl)phenlypropan-1-none, 2-methyl-1-(4-(methylthiophenyl)-2-morholinopropanone, maleimides, 2,4,5-trimethylbenzoly-diphenyl phosphine oxides, bis(2,6-dimethyloxybenzoyl) 2,4,4-trimethylpentyl)phosphine oxide, bis(2,4,6-trimethylbenzoyl)-phenylphosphineoxide, polymeric photoinitiators derived from the above, and combinations thereof. In one embodiment, a propanone photoinitiator may be utilized such as a blend of about 70 wt. % oligo(2-hydroxy-2-methyl-1-[4-(1-methylvinyl)phenyl]propanone and about 30 wt. % 2-hydroxy-2-methyl-1-phenyl propan-1-one, commercially available from Lamberti USA, Inc., Conshohocken, Pa. under the trade name Esacure® KIP 150 or KIP 100F. Other photoinitiators sold by Lamberti USA, Inc. under the KIP or Esacure® designation may also be utilized, such as Esacure SM 303. Other polymeric photoinitiators include PL-816A from Palermo Lundahl Industries. In another embodiment, an oxide photoinitiator may be utilized. One suitable oxide photoinitiator is bis(2, 4,6-trimethylbenzoyl)-phenylphosphineoxide commercially available from Ciba Specialty Chemicals, Tarrytown, N.Y. under the trade name Irgacure® 819. Other photoinitiators sold by Ciba Specialty Chemicals under the Irgacure® trade name are also suitable for use.

Certain compounds act as both a photoinitiator and a crosslinker. These compounds are characterized by the ability to generate two or more reactive species (e.g., free radicals, carbenes, nitrenes, etc.) upon exposure to UV-light and to subsequently covalently bond with two precursor polymers. Any compound that can perform these two functions can be utilized, and representative compounds include sulfonyl azides described in U.S. Pat. No. 6,211,302 to Ho, et al. and U.S. Pat. No. 6,284,842 to Ho, et al., both of which are incorporated herein by reference.

The aqueous mixture may include other additives suitable for the desired properties of the mixture or the cured electrode binder. Additives may be utilized in the coating composition up to about 10 wt. % for each additive, in some embodiments up to about 5 wt. %, and in some embodiments up to about 2 wt. % of the aqueous mixture. Additives that may be incorporated in the aqueous mixture can include, without limitation, coupling agents, adhesion promoters, dispersants, curing accelerants, photosensitizers, wetting agents, defoamers, etc. For example, a suitable coupling agent is γ-glycidoxypropyltrimethoxysilane such as Silquest® A-187, commercially available from Momentive Performance Materials, Albany, N.Y.

In one embodiment, a wetting agent can be included in the aqueous mixture. A wetting agent can improve the contact and wetting between the solid electrode particles, the polymer precursor, and the current collector onto which the aqueous mixture can be applied during formation of the electrode. Accordingly, inclusion of a wetting agent can improve the adherence between the various components following cure of the electrode binder. A wetting agent can also improve the solubility and dispersability of the other components of the aqueous mixture.

Wetting agents can include both sacrificial materials, which will generally be volatized prior to or during the cure of the binder coating composition, as well as materials that can remain in the product following cure. For instance, a wetting agent can also function as an electrolyte following cure of the binder. Exemplary wetting agents can include, without limitation, acetone, isopropyl alcohol, dimethyl carbonate, and the like. In general, any solvent or electrolyte material that can improve wetting and contact between the components of the aqueous mixture and the current collector can be utilized. In one embodiment, fast evaporating, low boiling temperature wetting agents can be utilized. By way of example, a wetting agent can have a boiling point of less than about 160° F. (about 71° C.), Beneficially, by utilization of a low boiling point wetting agent, the wetting agent can be dissipated during the UV/EB cure, and the substantial thermal energy input necessary for solvent removal of previously known processes is not necessary. Alternatively, wetting agents can be utilized that are designed to remain in the material following the cure, for instance for use as an electrolyte.

Figure 1:
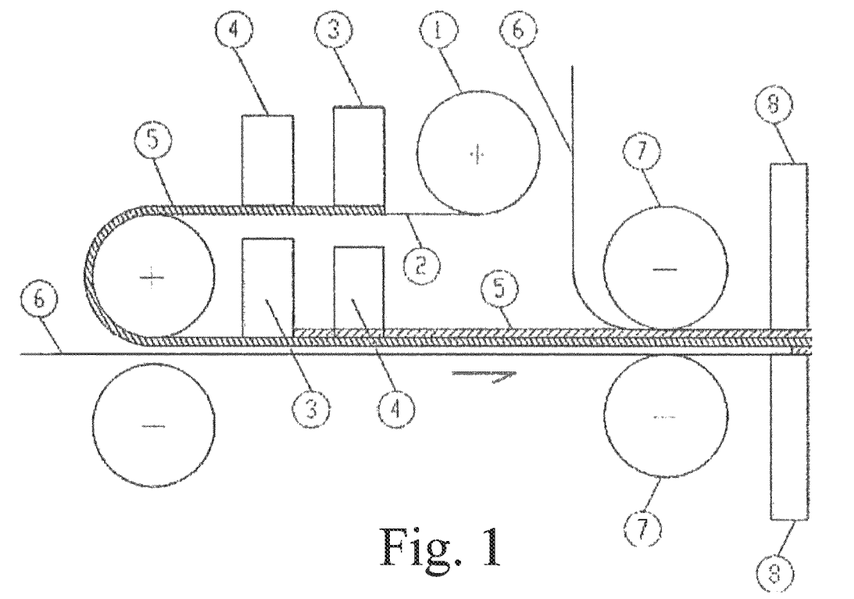
FIG. 1 is a plan view of one embodiment of an electrode manufacturing process as disclosed herein.
Figure 2:
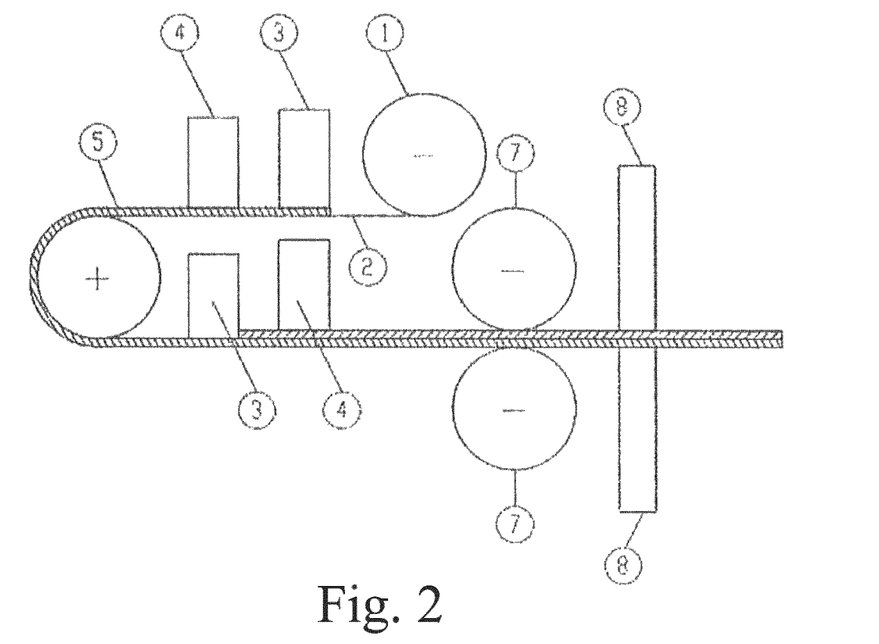
FIG. 2 is a plan view of another embodiment of an electrode manufacturing process as disclosed herein.
Figure 3:
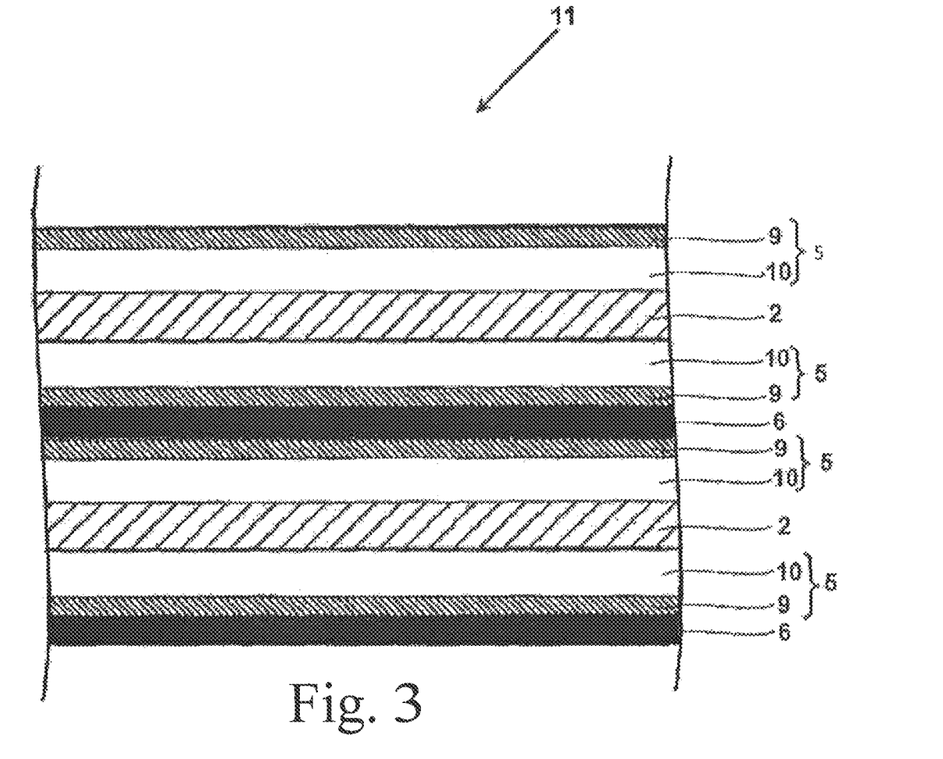
FIG. 3 is a cross-sectional view of a lithium ion electrochemical cell according to one embodiment of the disclosure.

Referring now to the figures, FIG. 1 and FIG. 2 present embodiments for applying the aqueous mixture as a layer 5 to an electrode current collector 2 and FIG. 3 illustrates a formed product. In the FIG. 3, the solid electrode particles 9 and the remainder of the aqueous mixture 10, are shown as separate layers. In general, however, the two are applied to a current collector 2 pre-mixed as a single aqueous mixture to form a single layer 5. The polymer precursors of the layer 5 are cured on the current collector 2 utilizing actinic and/or EB radiation. Following crosslinking to form a matrix adhered to a current collector, the crosslinked polymer precursors can exhibit excellent chemical resistance and can be insoluble in electrolytes at elevated temperatures while demonstrating exceptional adhesion to current collectors.

In further detail, referring to FIG. 1 and FIG. 2, an electrode current collector feed roll 1 supplies electrode current collector 2. An applicator 3 can mix the solid electrode particles with the remainder of the aqueous mixture and apply a thin layer 5 of the aqueous mixture to moving current collector 2. This application coating may be accomplished by conventional coating techniques such as, gravure, flexo, slot die, reverse roll, knife over roll, flat and rotary screen printing, extrusion, offset, or the like.

Following formation of the electrode layer 5, the layer can be subjected to actinic radiation 4 and/or EB radiation 8, which can crosslink the polymer precursors of the layer 5. For instance, upon subjection of the aqueous mixture to UV, visible and/or EB radiation and, when necessary, in the presence of a photoinitiator, the crosslinking agents of the aqueous mixture can react with reactive functional groups of the polymer precursors, forming covalent bonds throughout the layer and thereby firmly encapsulating the solid electrode particles within the crosslinked network and also firmly binding the layer 5 to the current collector 2.

The formation method can incorporate a relatively short residence time for actinic radiation curing 4 and/or EB curing 8. The resulting application of the layer 5 to electrode current collector 2 and the crosslinking thereof can thus increase production speeds and reduce costs. Multiple applicator stations 3 may be employed to build up several layers of electrode coating materials, optionally with separator layers therebetween, so that the resulting final thickness required can be accomplished at high speeds of for example from about 20 ft/min to about 400 ft/min.

Separators that can be included between layers of electrodes can be any separator as is generally known in the art. For instance, when forming an EDLC or a lithium ion battery, a separator can be applied between adjacent electrode layers that is formed of a porous (and often reinforced) polymeric sheet, such as polytetrafluoroethylene (PTFE), polypropylene (PP), polyethylene (PE), polyethylene terephthalate (PET), or fused layers of PP & PE, and the like.

The aqueous mixture is generally applied in a very thin layer 5 to electrode current collector 2. Electrode layer 5 thickness may be from about 1 micron to about 500 microns, from about 5 microns to about 250 microns, from about 5 microns to about 200 microns, or from about 5 microns to about 150 microns. A layer 5 may be applied to one or both sides of the current collector 2. FIGS. 1 and 2 illustrate a system applying electrode layer 5 to each side of a current collector 2.

FIGS. 1 and 2 depict systems utilizing both actinic and EB radiation curing 4 and 8, respectively. Depending on the characteristics of the aqueous mixture, actinic radiation device 4 alone, EB radiation device 8 alone, or both may be utilized.

Referring to FIG. 1, an electrolyte 6 may be integrated with electrode current collector 2 and layer 5. Electrolyte 6 can be a solid, a liquid, or a gel, as is known in the art. For example, electrolyte 6 can be an organic electrolyte, such as a carbonate (e.g., ethylene carbonate or diethyl carbonate containing complexes of lithium ions), or an aqueous electrolyte, such as potassium hydroxide, sulfuric acid, or a liquid mixture of organic carbonates such as alkyl carbonate containing complexes of lithium ions (e.g., non-coordinated anion salts such as LiPF6, LiAsF6, LiClO4, LiBF4, and LiCF3SO3). If electrolyte 6 is liquid, a polymeric separator may be included in electrolyte layer 6. Generally, if electrolyte 6 is a solid or gel, an electrolyte separator is not needed, though a separator may still be utilized in these embodiments. If layer 5 is applied to both sides of the current collector 2, electrolyte 6 may be integrated on each side of current collector 2. The product may then be passed through calendar rolls 7 which can compress the layers to a desired thickness. If required, electron beam radiation device 8 may radiate through the electrolyte 6 to cure the binding material.

Referring to FIG. 2, illustrated is a process for manufacturing an electrode that does not incorporate an electrolyte. The technique depicted in FIG. 2 could be combined with the technique depicted in FIG. 1 to assemble an electrochemical cell 11 such as shown in FIG. 3. For example, the process depicted in FIG. 1 may be utilized to construct the anode or cathode (current collector 2 and layer 5) and electrolyte 6. The process depicted in FIG. 2 may be utilized to construct the opposing electrode without electrolyte 6. The products of FIG. 1 and FIG. 2 may then be combined to construct an electrochemical cell.

For instance, FIG. 3 generally illustrates a lithium ion electrochemical cell 11. As illustrated, the cell 11 includes current collector 2 with a layer 5 disposed on each side. The layer 5 includes anode (−) or cathode (+) active solid electrode particles 9 and the rest of the aqueous mixture 10. FIG. 3 also illustrates the solid electrode particles 9 and the rest of the aqueous mixture 10 separate within layer 5 for convenience of illustration. Electrolyte 6 and optionally an electrolyte separator (not shown) may be disposed on each electrode layer 5. As one skilled in the art appreciates, a lithium ion battery may comprise any number of electrochemical cells 11 in series or parallel as desired. In addition to cell 11, a lithium ion battery constructed in accordance with the disclosure may further include insulation material, casings, control circuitry, connectors, etc. as will be appreciated by those skilled in the art. Furthermore, the battery can be any type of lithium ion battery such as cylindrical, prismatic, pouch-type, or other batteries as are understood in the art.

Figure 4:
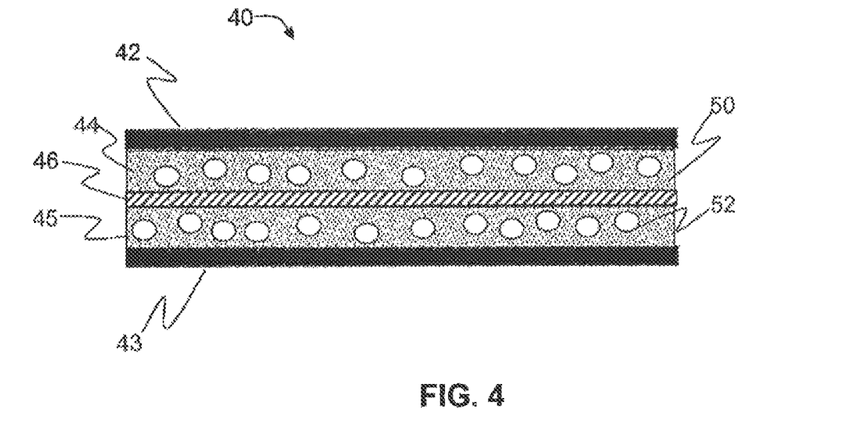
FIG. 4 is a cross-sectional view of an EDLC according to one embodiment of the disclosure.

Similarly, a first electrode and a second identical electrode can be assembled with a suitable electrolyte and separator therebetween to construct an EDLC. For instance, and with reference to FIG. 4, an EDLC 40 can include a first aluminum current collector 42 and a second aluminum current collector 43. The first and second current collectors 42, 43 can be separated by a separator 46. A first layer 44 and a second layer 45 on either side of the separator 46 can be the same or different. For instance, both layer 44 and 45 can include an actinic/EB radiation cured aqueous mixture 50 that includes solid particulates 52, e.g. graphite, in the mixture. The separator 46 can be any standard separator, for instance a porous PP-PE-PP film.

The present disclosure can provide numerous advantages. For instance, disclosed methods may significantly reduce manufacturing costs for electrodes, and thereby products produced therefrom. The advantages of the present disclosure can include, without limitation:

a) Substantial reduction of processing time for curing electrode binding materials.
b) Significant reduction in capital and operating costs by eliminating the need for thermal curing ovens and the associated energy inefficiencies of thermal drying in lieu of actinic and/or EB radiation curing stations.
c) Substantial reduction in space, building, and infrastructure and maintenance that accompany thermal curing. For example, existing thermal lines for automobile batteries are 300 ft long and run 10-20 ft per minute; two UV lamps can fit in a length of 2 feet (replacing 298 ft of production line) and produce batteries at 200 ft/min. So to expand the thermal line to run at the 200 ft/min, the thermal section of the production line would have to be increased to at least 3,000 ft long or building needs to be an additional 0.57 miles long.
d) Substantial reduction in energy and capital associated with the dehumidification of the production area as these coatings are usually applied in a clean room
e) The use of a shorter process line also means that foil does not have to be as thick to withstand the tension and its own weight during the long drying process; thinner foil results in a lighter weight battery, which is extremely beneficial in vehicle applications where the battery energy is used to move its own weight as well as the weight of the vehicle
f) Substantial reduction or elimination of the requirement of organic solvents which may substantially reduce or eliminate the costs of Volatile Organic Compound (VOC) procurement, recovery, and disposal.

The present invention may be better understood with reference to the following examples.

MATERIALS

Materials utilized in the Examples included the following:
Polymer Precursor
  PP 1—Ucecoat® 7689 acrylated polyurethane dispersion available from Cytec Industries, Inc.
  PP 2—Ucecoat® 7699 aliphatic polyurethane dispersion available from Cytec Industries, Inc.
Photoinitiator
  PI 1—2-hydroxy-methyl-1-phenyl propanone
  PI 2—bis(2,4,6-trimethylbenzoyl)-phenylphosphineoxide
  PI 3—1-hydroxycyclohexyl phenyl ketone
  PI 4—benzophenone
Solid Electrode Particles
  SEP1—mesocarbon microbead graphite (MSMB)
  SEP2—carbon black
  SEP3—lithium (nickel cobalt manganese) oxide
Dispersant
  Disp 1—Tamol™ 1254—polyacid dispersant available from the Dow Chemical Co.
  Disp 2—Solsperse® 41000 available from Lubrizol Corp.
Accelerant
  Triethanolamine
Photosensitizer
  Thioxanthone and isopropanol mixture
Defoamer
  Def1—Additol® VXW available from Cytec Industries, Inc.
  Def2—BYK®-028 available from BYK Chemie Wetting Agent Dowanol® PM Glycol Ether available from the Dow Chemical Co,

Example 1

An aqueous mixture for forming an anode binder was formed. Contents of the aqueous mixture are described in the table below.

|  | Aqueous Mixture (wt. %) | Solid Cured Coating (wt. %) |
| --- | --- | --- |
| Additional Water | 18.33 | 0.00 |
| PP 1 | 6.36 | 3.22 |
| PP 2 | 6.36 | 3.22 |
| PI 1 | 0.36 | 0.53 |
| PI 2 | 0.07 | 0.11 |
| SEP1 | 61.45 | 88.73 |
| Disp1 | 6.36 | 3.22 |
| Accelerant | 0.58 | 0.84 |
| Photosensitizer | 0.11 | 0.16 |
| TOTAL | 100.00 | 100.00 |

The aqueous mixture contained 18.3 wt. % added water to assist with the dispersion of the graphite. The total water in the aqueous mixture was 30.7 wt. % as many of the ingredients contained water. The coating was applied to a 25-um thick copper electrode, dried with a hot air gun and UV cured with 2 passes on a Miltec conveyor with a belt speed of 100 ft/min and equipped with two Miltec HPI 650 W/in lamps. The coating density was 8.3 mg/cm². The aqueous mixture could have been cured with an electron beam instead of UV light and the photoinitiators could then be deleted from the mixture.

Figure 5A:
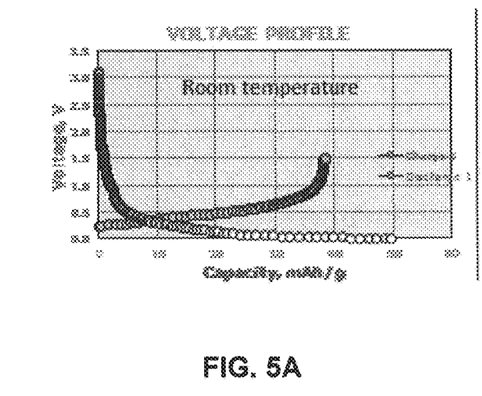
FIG. 5A and FIG. 5B present testing results for a cell including an electrode binder as described herein.
Figure 5B:
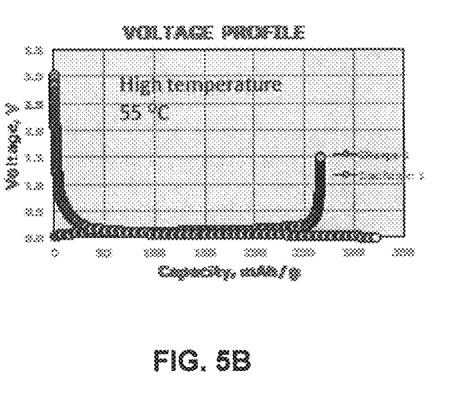

The electrode and coating was evaluated in a coin cell test with lithium metal as the counter electrode. Results are shown in FIG. 5A and FIG. 5B. In the evaluation of FIG. 5A, the first discharge was at 48 mAh/g and the first charge was at 38 mAh/g. In the evaluation at FIG. 5B, the first discharge was at 313 mAh/g and the first charges was at 264 mAh/g. As shown, the lithium ion battery was able to charge and discharge.

Example 2

An aqueous mixture for forming an anode binder was formed, Contents of the aqueous mixture are described in the table below.

|  | Aqueous Mixture (wt. %) | Solid Cured Coating (wt. %) |
| --- | --- | --- |
| Additional Water | 18.71 | 0.00 |
| PP 1 | 6.13 | 3.13 |
| PP 2 | 6.13 | 3.13 |
| PI 2 | 0.22 | 0.14 |
| PI 3 | 0.23 | 0.32 |
| PI 4 | 0.22 | 0.31 |
| SEP1 | 60.00 | 87.48 |
| SEP2 | 1.70 | 2.48 |
| Disp1 | 3.98 | 2.03 |
| Accelerant | 0.52 | 0.76 |
| Def1 | 0.19 | 0.22 |
| Wetting Agent | 1.99 | 0.00 |
| TOTAL | 100.00 | 100.00 |

The aqueous mixture was applied to a 25-um thick copper electrode, using a RK Control-Koter (R K Print-Coat Instruments Ltd., Hertz, UK) with a #9 Meyer rod. The water was dried from the coating with hot air. The coating was then UV cured with 2 passes on a Miltec conveyor with a belt speed of 100 ft/min and equipped with two Miltec HPI 650 W/in lamps. The coating density was 7.59 mg/cm².

Figure 6A:
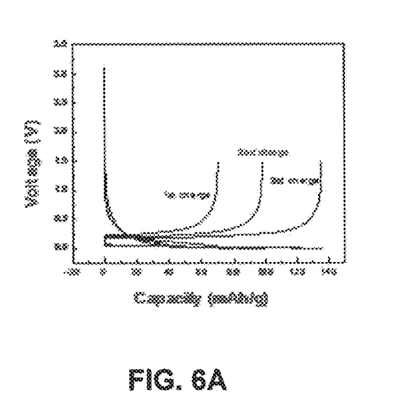
FIG. 6A and FIG. 6B present testing results for a cell including an electrode binder as described herein.
Figure 6B:
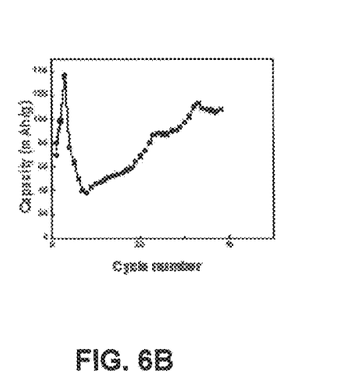

Results of examination are shown in FIG. 6A (Voltage change with respect to capacity) and FIG. 6B (Capacity change with respect to cycle number). This battery cycled through 40 cycles with increasing capacity as it cycled. The current density was 30 mA/g (C/10), the cut-off was 0.001-1.5 V, the loading was 6.8 mg/cm² for the MCMB electrode particles. C/10 was utilized for 3 cycles and C/3 for the remainder. As can be seen, this battery had higher capacity that that of Example 1. This is believed to be due to the additional carbon black.

Example 3

An aqueous mixture for forming cathode binder was formed. Contents of the aqueous mixture are described in the table below.

|  | Aqueous Mixture (wt. %) | Solid Cured Coating (wt. %) |
| --- | --- | --- |
| Additional Water | 15.38 | 0.00 |
| PP 1 | 3.75 | 1.64 |
| PP 2 | 3.75 | 1.64 |
| PI 1 | 0.37 | 0.46 |
| PI 2 | 0.10 | 0.05 |
| SEP2 | 3.98 | 5.00 |
| SEP3 | 69.33 | 87.00 |
| Accelerant | 1.63 | 2.05 |
| Disp2 | 1.57 | 1.98 |
| Def2 | 0.15 | 0.18 |
| TOTAL | 100.00 | 100.00 |

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure as claimed.

What is claimed is:

1. An electrode comprising a current collector and a layer bonded to the current collector, the layer comprising solid electrode particles held in an electrode binder, the electrode binder including UV crosslinked oligomers covalently bonded to one another and bonded to the current collector via UV radiation, the layer further comprising a photoinitiator, the oligomers comprising polyester oligomers, derivatized cellulose oligomers, polysulfide oligomers or silicone oligomers, the oligomers having a number average molecular weight of about 50,000 or less, and the oligomers being water dispersible or water dissolvable oligomers.

2. The electrode of claim 1, the electrode binder further comprising a reacted UV curable crosslinking agent covalently bonded to and crosslinking the oligomers.

3. The electrode of claim 1, wherein the photoinitiator is covalently bonded to the oligomers.

4. The electrode of claim 1, the electrode binder further comprising crosslinked monomers.

5. The electrode of claim 1, wherein the electrode is a cathode.

6. The electrode of claim 1, wherein the electrode is an anode.

7. The electrode of claim 1, the solid electrode particles including carbon particulate materials, silicon-based materials, metal oxide salts, ceramic materials, or combinations thereof.

8. The electrode of claim 7, wherein the electrode particles include a lithiated compound.

9. A battery comprising the electrode of claim 1.

10. The battery of claim 9, wherein the battery is a lithium ion battery.

11. A double layer capacitor comprising the electrode of claim 1.

12. The electrode of claim 1, wherein the solid electrode particles are encapsulated within a network comprising the crosslinked oligomers.

13. The electrode of claim 1, wherein the layer is from about 1 micron to about 500 microns in thickness.

14. An electrode comprising a current collector and a layer bonded to the current collector, the layer comprising solid electrode particles held in an electrode binder, the electrode binder including UV crosslinked oligomers covalently bonded to one another and bonded to the current collector via UV radiation, the layer further comprising a photoinitiator, the oligomers comprising polyethylene oligomers, polypropylene oligomers, polystyrene oligomers, polyvinylcyclohexane oligomers, or oligomers comprising polymerized 1-butene, 1-hexene, 1-octene, 4-methyl-1-pentene, cyclohexene, styrene, toluene, or α-methylstyrene, the oligomers having a number average molecular weight of about 50,000 or less, and the oligomers being water dispersible or water dissolvable oligomers.

15. The electrode of claim 14, the electrode binder further comprising a reacted UV curable crosslinking agent covalently bonded to and crosslinking the oligomers.

16. The electrode of claim 14, wherein the photoinitiator is covalently bonded to the oligomers.

17. The electrode of claim 14, the solid electrode particles including carbon particulate materials, silicon-based materials, metal oxide salts, ceramic materials, or combinations thereof.

18. The electrode of claim 17, wherein the electrode particles include a lithiated compound.

19. The electrode of claim 14, wherein the layer is from about 1 micron to about 500 microns in thickness.

20. A battery comprising the electrode of claim 14.

21. The battery of claim 20, wherein the battery is a lithium ion battery.

22. The electrode of claim 14, wherein the solid electrode particles are encapsulated within a network comprising the crosslinked oligomers.

* * * * *